(12) United States Patent
Nano et al.

(10) Patent No.: US 10,235,436 B2
(45) Date of Patent: Mar. 19, 2019

(54) EVENT STREAM TRANSFORMATIONS

(71) Applicant: Microsoft Technology Licensing, LLC, Redmond, WA (US)

(72) Inventors: Olivier Nano, Munich (DE); Ivo Jose Garcia dos Santos, Munich (DE); Eldar Akchurin, Munich (DE); Lev Novik, Redmond, WA (US); Tihomir Tarnavski, Redmond, WA (US); Panagiotis Periorellis, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 765 days.

(21) Appl. No.: 14/515,382

(22) Filed: Oct. 15, 2014

(65) Prior Publication Data

US 2016/0063080 A1 Mar. 3, 2016

Related U.S. Application Data

(60) Provisional application No. 62/044,090, filed on Aug. 29, 2014.

(51) Int. Cl.
*G06F 17/00* (2006.01)
*G06F 17/30* (2006.01)
*H04L 29/08* (2006.01)

(52) U.S. Cl.
CPC .. *G06F 17/30563* (2013.01); *G06F 17/30498* (2013.01); *G06F 17/30516* (2013.01); *H04L 67/12* (2013.01)

(58) Field of Classification Search
CPC .... G06Q 10/10; G06Q 10/101; G06Q 10/103; H04L 51/16; H04L 51/04; G06F 17/30498; G06F 17/30516; G06F 17/30563
See application file for complete search history.

(56) References Cited

U.S. PATENT DOCUMENTS 6,567,813 B1 * 5/2003 Zhu ................ G06Q 10/10
707/802
8,069,190 B2 11/2011 McColl et al.
(Continued)

FOREIGN PATENT DOCUMENTS

CN 102340495 A 2/2012

OTHER PUBLICATIONS

Cisco WebEx, "WebEx Meeting Center User Guide, For Hosts, Presenters, and Participants", copyright 1997-2013, pp. 1-245, www.cisco.com/c/dam/en/us/td/docs/collaboration/meeting_center/wx_mc_host_ug.pdf.*

(Continued)

*Primary Examiner* — Cheryl Lewis
(74) *Attorney, Agent, or Firm* — Workman Nydegger

(57) ABSTRACT

The formulation of transformations on one or more input event streams to generation one or more output event streams. Accordingly, the transformations may be considered to be a query on the original input event stream(s). The event query includes event stream source representations representing an input event stream available in a particular execution context. The event query also includes a transformation module identifying the transformation set to be performed on the input event streams in the execution context. Once the query is properly formed, an execution module may then cause the transformations to be executed upon the designated input event stream(s) to generate output event streams.

22 Claims, 6 Drawing Sheets

(56) References Cited

U.S. PATENT DOCUMENTS

| | | | |
|---|---|---|---|
| 2010/0131556 A1 | 5/2010 | Meijer et al. | |
| 2011/0061054 A1* | 3/2011 | Hurley | G06F 9/5055 718/102 |
| 2011/0093490 A1 | 4/2011 | Schinlauer et al. | |
| 2011/0137942 A1* | 6/2011 | Yan | G06F 17/30516 707/780 |
| 2013/0346446 A9 | 12/2013 | Jimenez Peris et al. | |
| 2018/0109670 A1* | 4/2018 | Prado | H04L 51/16 |

OTHER PUBLICATIONS

Cisco WebEX, "Getting Started Guide: Cisco WebEx Meetings", pp. 1-4, 2014.*

"International Search Report and Written Opinion Issued in PCT Application No. PCT/US2015/046622", dated Jan. 4, 2016, 11 pages.

"International Preliminary Report on Patentability Issued in PCT Application No. PCT/US2015/046622", dated Jan. 3, 2017, 7 Pages.

Soule, Robert, "Reusable Software Infrastructure for Stream Processing", In PhD Dissertation, May 2012, 177 pages.

Botan, et al., "Federated Stream Processing Support for Real-Time Business Intelligence Applications", In Third International Workshop of Enabling Real-Time Business Intelligence, Aug. 24, 2009, 18 pages.

Sato, et al., "Ordered Types for Stream Processing of Tree-Structured Data", In Journal of Information Processing, vol. 19, Jan. 2011, 9 pages.

Zhou, et al., "SCEPter: Semantic Complex Event Processing over End-to-End Data Flows", In Technical Report 12-926, Apr. 2012, 20 pages.

Paul, Arindam, "SPARK streaming and other real time stream processing framework", Published on: Oct. 31, 2013 Available at: http://arindampaul.tumblr.com/post/43407070026/spark-streaming-and-other-real-time-stream-processing.

Anicic, et al., "EP-SPARQL: A Unified Language for Event Processing and Stream Reasoning", In Proceedings of the 20th International Conference on World Wide Web, Mar. 28, 2011, 10 pages.

Anicic, et al, "Stream Reasoning and Complex Event Processing in ETALIS", In Journal of Semantic Web, vol. 3, No. 4, Oct. 2012, 10 pages.

Shiva, Foruhar Ali, "Application of a Temporal Database Framework for Processing Event Queries", In Doctoral Dissertation, Jul. 2011, 67 pages.

Ali, et al., "Microsoft CEP Server and Online Behavioral Targeting", In Proceedings of the VLDB Endowment, vol. 2, Issue 2, Aug. 24, 2009, 4 pages.

* cited by examiner

EVENT STREAM TRANSFORMATIONS

CROSS REFERENCE TO RELATED APPLICATIONS

This application claims the benefit of U.S. Provisional Application Ser. No. 62/044,090, filed Aug. 29, 2014, which provisional patent application is incorporated herein by reference in its entirety.

BACKGROUND

An event is a piece of data associated with one or more timestamps. An event stream is a stream of events. An event source can receives events, sort them by timestamp, and provided an ordered event stream. There are various conventional mechanisms to process event streams. Each involves the expression and execution of transformations on the event streams. However, due to the asynchronous nature of events and parallel processing, the streaming domain is naturally complex. Consequently, the learning curve for a new user querying against event streams is conventionally very steep.

Currently, there are two main approaches to expressing data transformations in event processing: domain specific languages (DSL) and general-purpose programming languages (GPPL). DSLs usually take some form of an SQL-like language with additional ability to handle a time dimension. DSLs provide a declarative way to describe the query in high abstractions. Furthermore, DSLs resemble SQL to help reduce the learning curve and enable even non-developers to write queries. The major problems of DSLs are the difficulty with user defined extensions and integration with applications, which is usually written in a GPPL. Writing queries directly in GPPL enables smoother integration with the application that uses the data, but requires the author to know the GPPL.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY

At least some embodiments described herein relate to the formulation of transformations on one or more input event streams to generation one or more output event streams. Accordingly, the transformations may be considered to be a query on the original input event stream(s). The event query includes event stream source representations representing an input event stream available in a particular execution context. The event query also includes a transformation module identifying the transformation set to be performed on the input event streams in the execution context. Once the query is properly formed, an execution module may then cause the transformations to be executed upon the designated input event stream(s) to generate output event streams.

In some embodiments, the programming abstraction that is available for expressing the input event stream is the same regardless of the input event stream. For instance, the same programming abstraction may be used to designate a contemporary event stream as well as a historical event stream. A programming abstraction might allow a contemporary event stream to be joined with a historical version of the same event stream.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
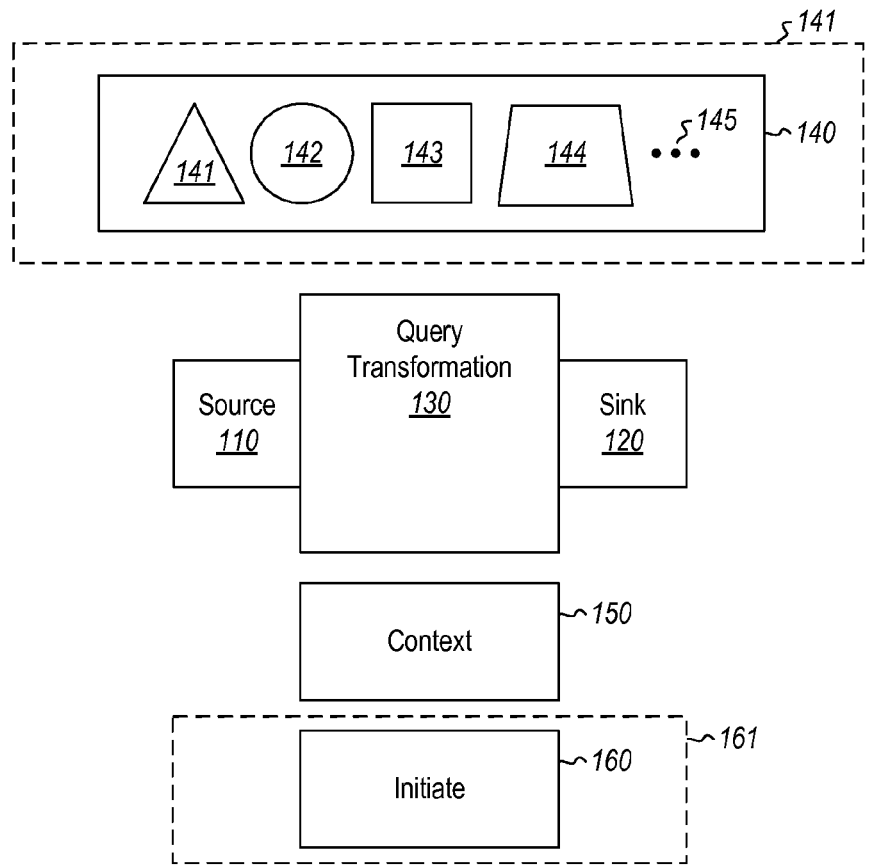
FIG. 1 illustrates an event processing programming model that shows an authoring environment aspect of the model.

A comprehensive, yet easy to use, event processing programming model is described herein in which queries may be expressed and executed upon one or more event streams to thereby result in one or more resulting event streams. An event is a piece of data associated with one or more timestamps. At least some embodiments described herein relate to the formulation of transformations on one or more input event streams to generation one or more output event streams. Accordingly, the transformations may be considered to be a query on the original input event stream(s). The event query includes event stream source representations representing an input event stream available in a particular execution context. The event query also includes a transformation module identifying the transformation set to be performed on the input event streams in the execution context. Once the query is properly formed, an execution module may then cause the transformations to be executed upon the designated input event stream(s) to generate output event streams.

In some embodiments, the programming abstraction that is available for expressing the input event stream is the same regardless of the input event stream. For instance, the same programming abstraction may be used to designate a contemporary (e.g., live) event stream as well as a historical event stream, even perhaps in the same query. Consider the following query expressed in natural language: "Trigger an alarm when average energy consumption in a one day time frame is 50% higher than the energy consumed the same day one year before." Conventionally, such scenarios are addressed by users writing complex custom logic. A programming abstraction might allow a contemporary event stream to be joined with a historical version of the same event stream. Thus, a unified event query model is described that is agnostic to the type of event stream (so long as the event stream is available in the execution context).

The experience of programming the event stream query transformation set may be substantially the same regardless of the execution context (e.g., regardless of whether the execution context is on the local computing system, on a remote server, or in the cloud). The execution context uses context identification to obtain the necessary information to identify the execution context and cause the query transformation set to be run in the designated execution context. This flexibility in where event query processing is performed allows computations to happen closer to where the input event stream(s) is generated and/or where the output event stream(s) is consumed. Accordingly, embodiments of the event processing programming model are agnostic to the execution context (so long as the execution module has sufficient information to identify and deploy the query in that execution context).

Embodiments of the event processing model described herein have a gradual learning curve for the user, while still being expressive and extensible. Due to the asynchronous nature of events and parallel processing, the streaming domain is naturally complex. Consequently, the learning curve for a new user querying against event streams is conventionally very steep. For ease of use, the event processing programming model limits the number of concepts/abstractions in the Application Program Interface (API) that the user is exposed to, and clearly defines the semantics of such abstractions. At the same time, to enable expressiveness, these abstractions are composable and allow the user to build higher-level query logic from primitive built-in event processing computations. The described event processing programming model defines abstractions that can be represented in both domain specific languages (DSL) and general-purpose programming languages (GPPL).

The event processing programming model is described as implementing a temporal model for event streams. In the Application Program Interface (API) described below, each event has an associated single time stamp representing when the event was generated. However, the more general principles described herein could also support sequence models, interval/snapshot models, or any other event processing time models. The principles described herein may also be applicable in an event processing programming model that allows interaction with multiple event processing time models (such as temporal model, interval/snapshot model, and so forth) with a clear defined user experience separation between the event processing time models.

The event processing programming model also explicitly defines the concept of time and works in virtual time (i.e., application time). Many monitoring and telemetry scenarios involve analysis on log records that have their own timeline different from a wall clock time (i.e., system time). Here is an example of such a query in natural language form: "Alert all cases when there was no response within one hour timeframe". Such a query does not involve evaluation of system time.

The event processing programming model provides expressiveness by defining event processing computations in such a way that they can be parallelized automatically by the underlying service that runs the query. Thus, the event processing programming model can elastically scale-out computations by providing convenient grouping abstractions.

First, the concept of the temporal data processing model will be introduced. Consider the following scenario. Suppose there is a set of performance counter values that are taken from different machines in a data center. In this scenario, the system is to discover anomalies in the performance counter values over time. The time of a performance counter value is the time when the value was read, not when the corresponding event is processed. Accordingly, the event processing programming model introduces a temporal model.

This temporal model is based on virtual time, and is built on a subset of the Complex Event Detection and Response (CEDR) algebra and is based on virtual time. All of the operators in the temporal model refer to the virtual time timestamp within each of the events. In one embodiment, in order to simplify semantics for the user, events in the temporal model are point events, in that the events each have exactly one timestamp and carry the payload for one point in time. Examples of point events include a meter reading, an arrival of an e-mail, a user Web click, a stock tick, or an entry into a log.

All operators in this temporal model may be deterministic and the output of operators may be repeatable. In one example, the query receives as its input an event stream referred to as a source, performs transformations (e.g., filtering, selecting, and so forth) using that event stream input (i.e., performs a query on that input event stream), and generates a resulting data stream referred to as a sink. The source receives various events from various locations, and provides the resulting event stream. In some embodiments, the source might also perform some further on the events to produce the event stream, such as sorts the events by temporal time.

FIG. 1 illustrates an event processing programming model that shows an authoring environment 100 aspect of the model. An authoring module 141 allows an author to author the event stream source representation 110, the event stream sink representation 120, the transformation module 130, and the context identification module 150.

Figure 2:
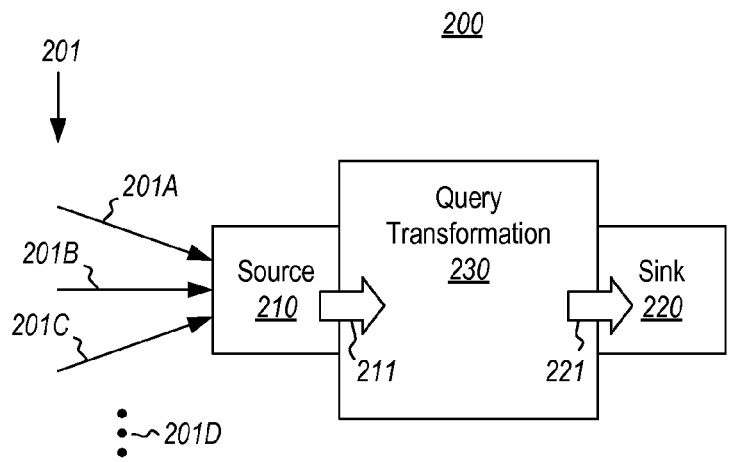
FIG. 2 illustrates an event processing programming model that shows an execution environment aspect of the model.

After authoring, an initiate command 160 may be initiated, which automatically causes the transformation module 130 to be executed in an execution context identified in the context identification module 150. For instance, FIG. 2 illustrates an executable transformation component 230 executing in the execution environment 200.

The query transformation module 130 represents a specific query to be performed on an input event stream to thereby generate an output (or resulting) event stream. Specifically, the query transformation module 130 may represent a transformation set of one or more transformations to be performed on one or more input event streams to thereby generate one or more output event streams. Examples of transformation operations might include filtering of each of the one or more event stream sources so that only some of the events are permitted to pass. Other transformations might include logic performed using the event stream source events to thereby generate one or more resulting events. Such logic may be performed on the event stream source directly, or only the events filtered through one or more filters.

In the execution environment, the corresponding query transformation component 230 receives an event stream source 210 as input. The event stream source 210 receives events 201 (such as events 201A, 201B, 201C, amongst potentially many others as represented by the ellipses 201D) and provides the result as the input event stream 211. The query transformation component 230 processes the input event stream to thereby perform the query represented in the query transformation module 130. As a result of the processing, the query transformation component 230 generates an output (resulting) event stream 221 that is provided to an event stream sink 220. The output event stream 221 represents the query results of the query associated with the query transformation component when the query is applied to the input event stream 211. The event stream source 210 and the event stream sink 220 may be thought of themselves as event streams. Accordingly, an event stream sink may later act as an event stream source for a different query processing.

At authoring time, the author uses the authoring module 141 to formulate an event stream source representation 110 representing the event stream source 210 available in the execution context 200. The authoring module 141 is also used to formulate the query transformation module that identifies the transformation set of one or more transformations 130 to be performed on one or more input event streams represented by (or associated with) the transformation module. The transformation module 130 may reference or be associated with the event stream source representation 110. The authoring module 141 may also be used to formulate an event stream sink representation 120 representing the event stream sink 220 available in the execution context 200. The transformation module 130 may reference or may be associated with the event stream sink representation 120. The authoring module 141 may also be used to formulate a context identification module 150 that identifies the execution context.

The execution context 150 contains definitions for event stream sources and event stream sinks available in the context. By extension, the set of operations available may also be inferred from the available source and sink definitions. For example, as illustrated in FIG. 2, the execution context 200 includes an instance 210 of the event stream source 110, and an instance 220 of the event stream sink 120. The context identification module 150 may identify the context implicitly (e.g., as a default context in the absence of an expressed context identification), or explicitly. For instance, the default context might simply be to just execute the instance of the query transformation component 130 on the same system that initiated the query. As examples only, the execution context might be the local computing system, a cloud computing environment, or any other execution environment.

The authoring environment 100 also includes an execution module 161 that, upon detection of one or more conditions and/or events, interprets the transformation module 130 to facilitate the corresponding query transformation component 230 being executed in the execution context 200. For instance, the execution module 161 may include an initiate command or control 160 (or "management API") configured to initiate the execution module 161 upon detection of user input. The initiate command 160 automatically causes the event processing programming model to be run in the execution context 200. For instance, if the context identified in the content identification component 150 indicates that the query is to be run locally, then the query transformation component 230 may be run locally on a local computing system. If the execution context identified in the context identification component 150 is a cloud computing environment or some type of remote server, then the query transformation module 130 will be uploaded to that cloud computing environment or other type of remote server, instantiated the query transformation component 230, and then run in that remote environment. Note that the context in which the instance 230 of the query transformation component 130 is run may be identified within the context identification component 150 without changing any of the query logic of the query transformation component 130 itself.

Figure 3:
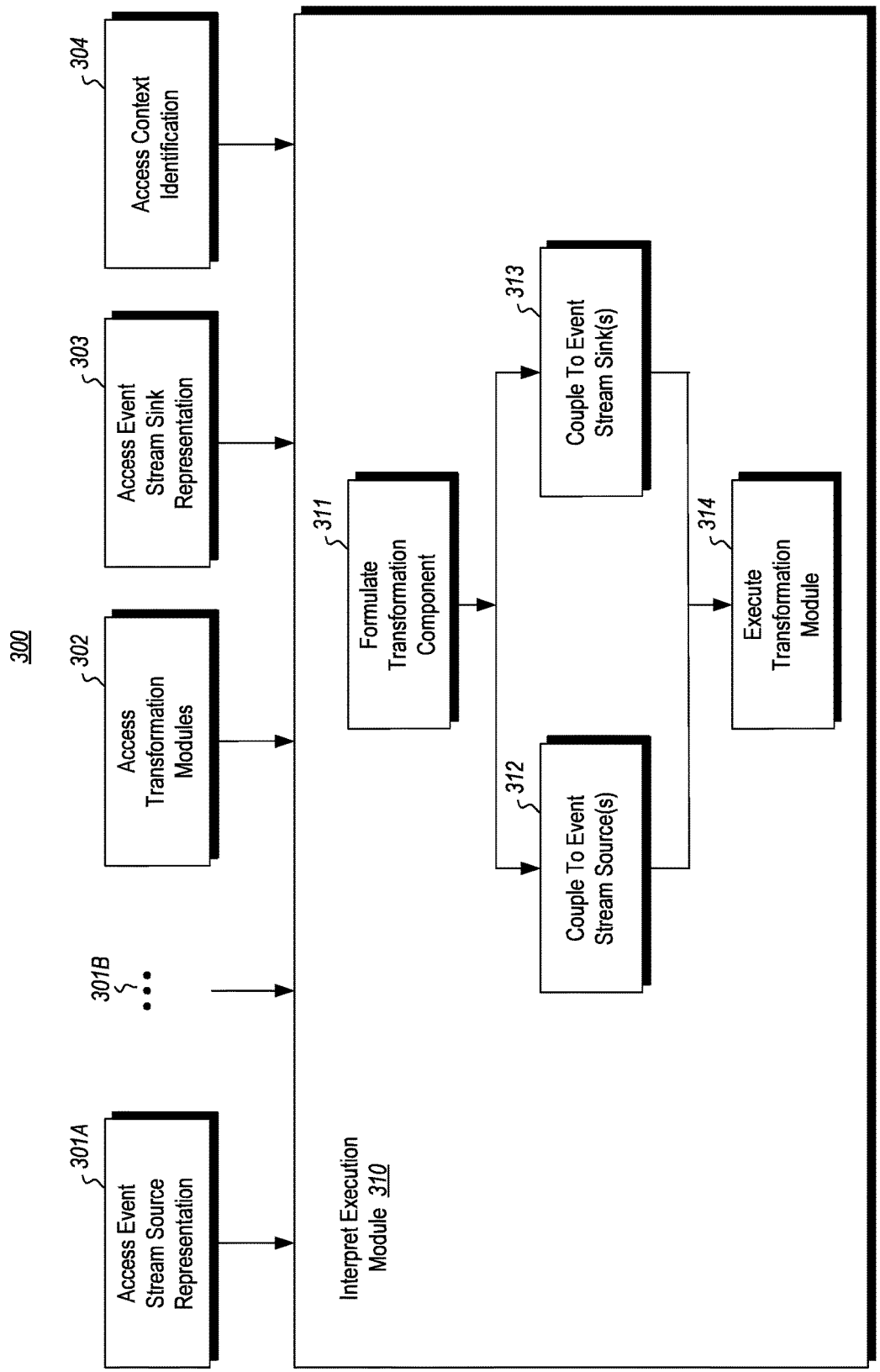
FIG. 3 illustrates a flowchart of a method for causing the transformation component to be prepared for operation in the execution environment.

FIG. 3 illustrates a flowchart of a method 300 for causing the transformation component 230 to be prepared for operation in the execution environment 200. The method 300 may be performed in response to the author initiating the initiate command 160 of FIG. 1.

An event stream source representation is accessed (act 301A). For instance, in FIG. 1, event stream source representation 110 is accessed. There is no limit to just one event stream source representation. Accordingly, another event stream source presentation may be accessed (act 301B). The other event stream source representation also represents a particular event stream available in the execution context 200 (although not shown in FIG. 2). As an example, the event stream source 110 might be a contemporary event stream, whereas the additional event stream source (not shown) might be a historical event stream. The transformations might include performing a historical time-shifted version of the input contemporary event stream.

The transformation module is also accessed (act 302). For instance, in FIG. 1, the transformation module 130 may be accessed. Also, the event stream sink representation is accessed (act 303), along with the context identification component (act 304). For instance, the execution module 161 might access the transformation module 130, the event stream sink representation 120, and the context identification component 150.

Then, the execution module interprets (act 310) the transformation module to cause the transformation set to be performed in the execution context 200 on the identified one or more input event streams to generate the resulting event stream. To do so, the execution module 161 uses the context identification within the context identification module 150. For instance, the execution module obtains an instance of a transformation component (act 311) such as transformation component 230. The execution module also couples the transformation component to any event stream source (act 312) (such as event stream source 210) identified by an event stream source representation (such as event stream source representation 110). The execution module also couples the transformation component to any event stream sink (act 313) (such as event stream sink 220) identified by an event stream source representation (such as event stream source representation 120). The transformation component 230 may then be executed (act 314).

Returning to FIG. 1, the authoring module 141 includes a set 140 of programming abstractions that may be used by the author to formulate the event stream source representation 110, the event stream sink representation 120, the query transformation module 130, and the context identification component 150. For instance, the abstractions 140 are illustrated as including abstractions 141 through 144, although the ellipses 145 represent that there may be any number of abstractions used by the programmer to author modules event stream representations 110 and 120, and modules 130 and 150.

In embodiments described herein, the identity and type of the event stream source 110 and the event stream sink 120 may be changed without any fundamental change to the query transformation module 130, perhaps other than just in the identification of the event stream source 110 itself, and/or other than just in the identification of the event stream sink 120 itself.

For instance, in the example of FIG. 1, one of the abstractions 140 may be used to identify an event stream source (such as event stream source 110). The following is an example of an abstraction called and ITemporalSourceDefinition interface. Of course, any names of particular abstractions described herein are arbitrary. What is more important is the function of the abstractions. The following is an example HTTP Source definition that uses the ITemporalSourceDefinition interface:

```
ITemporalSourceDefinition<int, CpuReadings> input =
    service.GetTemporalHttpSource<int, CpuReading>(
        "http://europe.azure.com/cpu-readings", // name
        e => e.MachineId,                       // key selector
        ...);
```

Temporal sources (such as the HTTP Source just defined) produce events ordered by virtual time. They can have some specific parameters depending on the type of the source. For instance, in some types of temporal event stream sources, queue names might have relevance. Other types of temporal event stream sources might have timestamp selections or grouping key selectors.

In distributed scenarios, it is possible for the event stream source (e.g., event stream source 210) to receive events (e.g., events 201) out-of-order. The event stream source keeps track of virtual time. As events are received, the event stream source determines the point time associated with the event, and advances application time accordingly. However, due to events arriving sometimes out-of-order, some events can arrive at the event stream source with a timestamp prior to the current application time. In other words, the event is time-stamped in the past by the reckoning of virtual time.

Imagine the following situation: there are three events with timestamps T1, T2 and T3. Timestamp T1 is before timestamp T2 which is before timestamp T3 according to application time reckoning. If the events take different routes to the event stream source, the events might arrive such that events having timestamps T1 and T3 arrive first, and only after that does the event with timestamp T2 arrive. If the event stream source moves virtual time to T3 when the event having timestamp T3 arrives—it is not clear what to do with the event have the timestamp T2.

There are two parameters of temporal event stream sources that help the user cope with the issue of events arriving out-of-order. One parameter is the out-of-order policy, which can be either "adjust" or "drop". If applying adjustment policy, all events with the timestamp less than the current virtual time will be re-timestamped with the current virtual time. In applying dropping policy, all such events will be dropped. However, other types of out-of-order policy might be imposed by the event stream source. An example of another out-of-order policy is an "abort" policy, in which events arriving out of order cause the query on the resulting event stream to be aborted.

Another parameter that enables toleration of out-of-order events is punctuation generation settings. They define how the service should advance virtual time of the input. In cases when the events are coming out-of-order, but the user does not want to re-timestamp them with out-of-order policy, the user can explicitly set how to generate punctuations on the source using an advance virtual time function. The advanced virtual time function takes current virtual time and list of all buffered events as input and returns a new virtual time. For example, to tolerate delay of 10 seconds in virtual time, the user can provide the following function:

```
settings.AdvanceTime =
    (currentTime, bufferedEvents) =>
        bufferedEvents.Last( ).Timestamp – bufferedEvents <
    TimeSpan.FromSeconds(10)
        ? current
        : bufferedEvents.Last( ).Timestamp)
```

Another example of an abstraction 140 is an abstraction for identifying and potentially defining an event stream sink 221 into which the resulting event stream is to go. In the example herein, such an abstraction is called the ITemporalSinkDefinition interface. The following is an sample of an event stream sink definition that uses the ITemporalSinkDefinition interface:

```
ITemporalSinkDefinition<string, int> storage =
    service.GetTemporalAzureQueueSink<string, CpuAverage>(
        "http://europe.azure.com/azurequeuesink",
        "connectionString");
```

Queries associated with the query transformation module 130 itself may be defined using abstractions that associate the query transformation module 130 with the event stream source 110, such that when the instance 230 of the query transformation component 130 is executed, the instance receives the input event stream 211 from the corresponding event stream source 210. An example of an abstraction 140 that may be used to do that is called herein a "From" method.

Queries associated with the query transformation module 130 may also be defined using abstractions that associate the query transformation component 230 with the event stream sink 210, such that when the instance of the query transformation component 230 is executed, the instance provides the output event stream 221 to the corresponding event stream sink 220. An example of an abstraction 140 that may be used to do that is called herein a "To" method.

The following is an example end-to-end query that uses the various abstractions 140 to define an event source, define an event stream sink, define the query logic, and connect the query logic to the defined event source and event sink.

```
var httpSource = service.GetTemporalHttpSource<string,
    CpuReading>(
        "http://europe.azure.com/cpu-readings",
        reading => reading.Region,
        AdvanceTimePolicy.Adjust);
var avgCpuStream = service.GetTemporalStream<int,
    AvgCpuByMachine>(
        "http://europe.azure.com/AvgCpu");
var q = TemporalInput.From(httpSource)
    .RegroupBy(e => e.MachineId)
    .Where(e => e.Payload.CpuUsage > 20)
    .Avg(new TumblingWindow (TimeSpan.FromMinutes(5)),
        e => e.Payload.CpuUsage,
        (key, avg) => new AvgCpuByMachine( )
            { Avg = avg, MachineId = key })
    .To(avgCpuStream);
service.StartQuery("streamAggQuery", q);
```

In this example, the event stream source is an HTTP source, and the query logic involves calculating the average CPU usage per machine:

The event processing programming model described herein allows its users to express low latency, incremental, scaled-out and reliable computations on data. The handling of data and computations of the data will now be described. As mentioned above, data is organized into event streams. Each event stream describes a potentially infinite collection of data that gets appended over time. For instance, each event is composed of a data and an associated timestamp. A computation on the data is represented by a query, which can be represented as a graph. Accordingly, when the user defines a query, the user is using basic building blocks (e.g., events source and sink definitions) to define the graph structure of data transformations, and is also defining the associated transformation itself. Such query definition may be performed declaratively.

Figure 4:
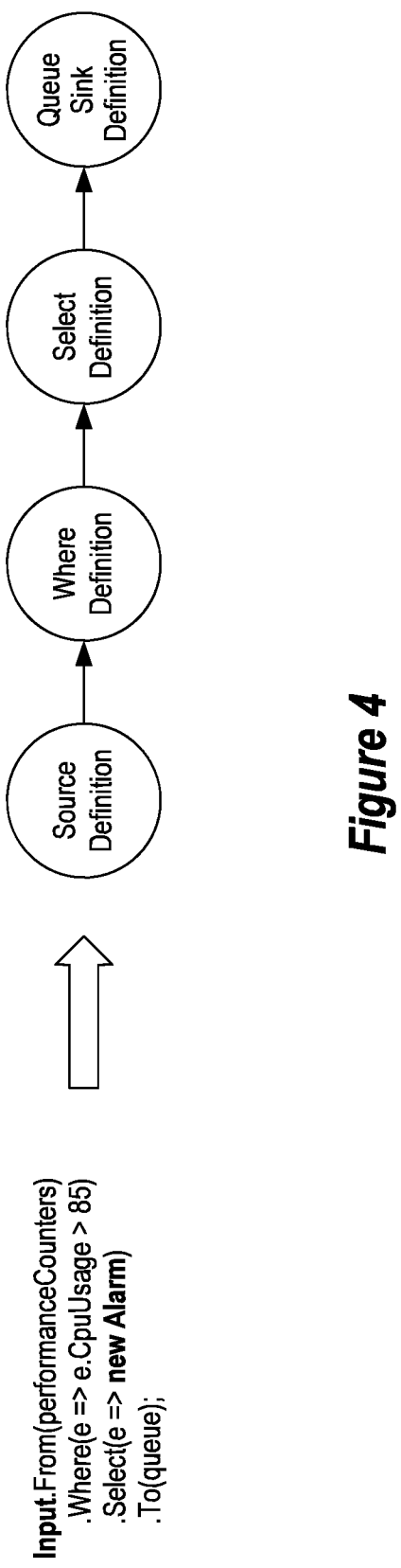
FIG. 4 illustrates a flow graph illustrating the transformation process.

For example, FIG. 4 illustrates a flow graph illustrating the transformation process. In FIG. 4, the user take a performance counter source definition, applies a filter ("where") transformation and a select transformation, and outputs everything into a queue. When this graph is submitted to the proper context (as identified by the context identification component 150) for execution (e.g., by execution of the initiate command 160), the graph is executed within a service for computation. The service interprets the graph to execute the graph at runtime. The service takes runtime data from the performance counters, filters and projects it and outputs to a queue. The runtime instantiation of this graph is a query. Accordingly, the event processing programming model consists of definition entities that map to runtime entities.

Definition entities are used to declaratively describe data flows and computations over them. These concepts only define behavior—they do not have any runtime constituent. For example, the definition of "filter" specifies that incoming data will be filtered according to some predicate. To draw a parallel with programming languages, a definition is analogous to a class. Composition of a query happens on the client side using the event processing programming model, but actual instantiation and execution of the query is performed on an event processing engine (which may be anyway and on any device).

Accordingly, the runtime entities are running instances that realize the definitions. The runtime entities are hosted and executed by the event processing engine or service and do real processing of data. They are analogous to objects in programming languages. For instance, during runtime, there is an instance of the event stream source 110 operating, an instance of the query transformation chain 130 operating, and an instance of the event stream sink 130 operating.

This description will now provide an example of how the event processing programming model may be implemented to do an example query using the C# programming language. In this example, suppose there is an HTTP endpoint, where all sensors from a room send their current temperature. In this scenario, the application should produce an alarm if the average temperature over a window of 1 minute from any sensor if that sensor exceeds 90 degree Celsius. Furthermore, the alarm should be written into an Azure queue. The following is a corresponding C# example of the query, which describes the query logic, the event stream source to be used, the event stream sink to be used, the context in which the query is to be run, and the corresponding initiate command. Line numbering and appropriate spaces are provided for subsequent reference and organization.

```
1: var service = new ServiceContext(serviceUri);
2: var source = service.GetHttpSource<int, Temperature>(ingressUri, e =>
       e.SensorId);
3: var sink = service.GetAzureQueueSink<int, Alarm>(connecionString,
4:         queueName);
5: var q = TemporalInput.From(source)
6:         .Average(new TumblingWindow(TimeSpan.FromMinutes(1)),
7:             reading => reading.Temperature)
8:         .Where(temperature => temperature > 90)
9:         .Select(temperature => new Alarm( ))
10:        .To(sink);
11: service.StartQuery("AlarmQuery", q);
```

In this example, the query is implemented in five logical steps. In line 1, the context in which the query is to be run is identified. This is an example of the context identification component 150 of FIG. 1. In this example, the context is obtained using a ServiceContext method, which represents an example of the abstractions 140 of FIG. 1.

In line 2, an event stream source is defined. In this example, the event stream source is an HTTP event stream source. However, the event processing engine might be capable of processing a wide variety of event stream sources. Accordingly, the abstractions 140 may include build-in support for different event stream source types. When defining a source the user may make a choice of the event type (Temperature in this case). There can be some other parameters which are specific to a particular source type (as ingressUri in the example). The last parameter in the call of line 2 is a grouping criteria, which is another example of an abstraction 140 of FIG. 1. The query might use such grouping criteria as identified by some key, so all operations defined in the query will be applied to each member of the group separately. In the example above, the queries are grouped by SensorId. That means the average/where/select operations (lines 5-10) will be applied to data from each sensor independently. Line 2 is an example of the event stream source 110 of FIG. 1.

In lines 3-4, the event stream sink is defined. Event stream sinks define where the output data (e.g., the output event stream) will end up in. In the example above, lines 3-4 specify the sink that will write data into an Azure queue. Lines 3-4 are an example of the event stream sink 120 of FIG. 1.

In lines 5-10, there is the query logic itself, which transforms the data from source to sink. The query consists of different source/sink definitions combined with each other. In the example, first the average over the window of 1 minute is calculated. After that, all events with temperature above 90 degree are filtered through. For any such event, an alarm is created using the "select" transformation. Lines 5-10 are an example of the query transformation component 130 of FIG. 1.

In line 11, the query is run within the event processing service (line 11). The last operation will create a running instance of the query with the specified name in the event processing service. To submit queries to the service, the user uses the service context which was acquired in line 1. Accordingly, line 11 is an example of the initiate command 160 of FIG. 1.

Even though the example is given in C#, the event processing programming model may be language agnostic. For instance, the model may provide SDKs in different languages, including C#, JavaScript, and so forth.

The concept of event source definition introduced in the previous section allows the event processing programming model to unify experiences between live and historical data, as well as device and cloud originated data. From the programming model perspective, there is no difference if the data is generated on the fly (as in case of HttpSource) or is taken from a table (as in case of AzureTableSource)—it is the detail of a particular source definition. The same is true for device and cloud originated source definitions. Unifying different types of data sources, the programming model allows the user to concentrate on the business logic of the query, which stays the same even if data sources will change in the future. For instance, in FIG. 1, the user may focus on authoring the query transformation component 130, whilst basic abstractions 140 may be used to allow the user to define appropriate sources, sinks, and context identifications.

Returning to the previous scenario, instead of creating an HTTP source (line 2 in the example above), and instead of pushing all data to the cloud and analyzing it there (lines 1 and 11 in the example above), the user can use a built-in device source definition (e.g., service.GetDeviceSource in line 1 of the example below) that will be instantiated on the device. An example of the code might be the following:

```
1: var deviceSource = service.GetDeviceSource<Temperature>(...);
2: var sink = service.GetAzureQueueSink<Alarm>(connecionString,
3:              queueName);
4: var q = TemporalInput.From(deviceSource)
5:         .Average(new TumblingWindow(TimeSpan.FromMinutes(1)),
6:             reading => reading.Temperature)
7:         .Where(temperature => temperature > 90)
8:         .Select(temperature => new Alarm)
9:         .To(sink);
10: service.StartQuery("AlarmQuery", q);
```

The data transformation logic (lines-10) did not change at all. There are only two primary differences. First, the source definition of line 1 has changed slightly (as compared to line 2 of the prior example), to identify the source as being that available to the device. Secondly, line 1 of the previous example was removed, causing the initiate command of line 10 to be executed in a default context (e.g., on the event processing service available to the device). The service itself may then decide how to better distribute and execute the query. For the example above, suppose calculation of average, filtering on the temperature and generation of the alarm can take place on the device, whilst propagating alarm events to the cloud only when necessary. In the same way, some parts of the query computation can be pushed to source definitions that represent relational databases, map/reduce execution engines, and so forth.

Event Processing Programming Model Principles and API

This section discusses main principles behind the event processing programming model and introduces the elements of an example Application Program Interface in more detail.

For event computations that operate in virtual time, there should be a way to move the application time forward. Typically, in event processing engines, the advance of virtual time is communicated by a special event which is called a punctuation. During query processing, the virtual time is driven by punctuation events. They are used to commit events and release computed results to the query output by telling the service that certain parts of the timeline will not change anymore for this particular input: by enqueueing a punctuation at time T, the input promises not to produce any subsequent events that would influence the period before T. This implies that, after a punctuation has been enqueued in the input, the virtual time of all other events should be not less than the enqueued punctuation. Violations of this rule are referred to as "punctuation violations". There can be different policies to cope with punctuation violations (i.e. dropping events, aborting the query or adjusting event time.)

In the event processing programming model, all events may also be considered to be punctuations, so users are not obliged to insert punctuations into the data flows explicitly. However, punctuation may still be used in some cases, such as when the user wants to flush current state of stateful operators. For example, consider the following example of FIG. 5, in which is considered the average over a tumbling window of 10 minutes.

Figure 5:
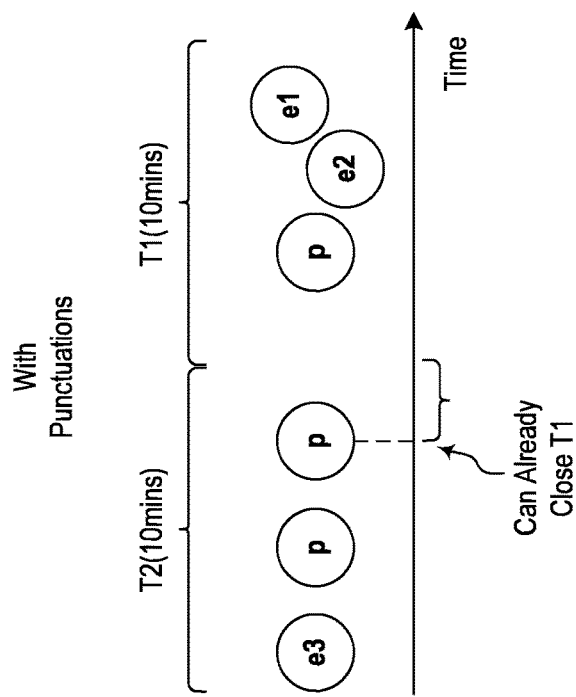
FIG. 5 illustrates an event stream in which is considered the average over a tumbling window of 10 minutes.
Figure 5:
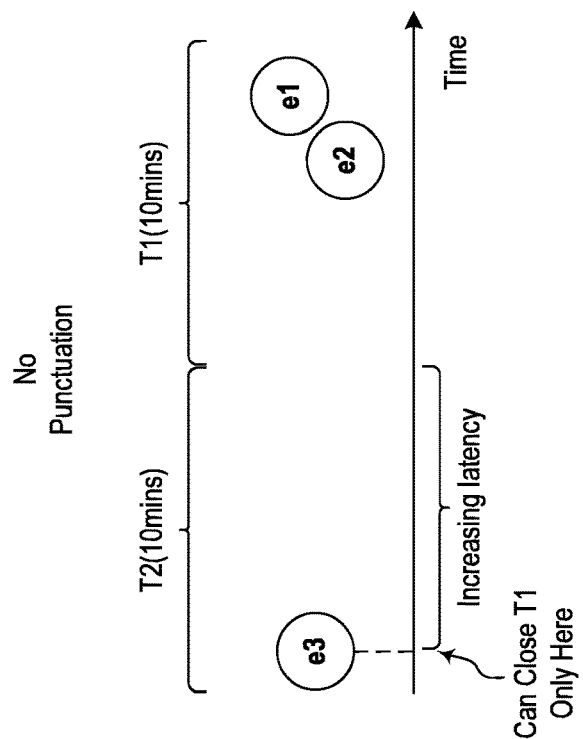

In FIG. 5, the operator is not allowed to produce any output for period T1 until the operator sees the next event with the virtual time belonging to period T2. This can lead to a long latency if the events are not uniformly distributed and new events only come at the end of period T2. To cope with this, the user can issue a punctuation that moves time forward and allows the operator to close the current window (picture on the right).

In addition to moving virtual time, there may be other types of punctuations, such as "on error" and "on complete" punctuations. "On error" punctuation is communicated to the downstream operators in case an error happened during event processing. "On complete" is issued when no events for this input are expected anymore.

The event processing programming model provides repeatability in the operators. An operator is repeatable if, for the same initial state and the same input, the operator deterministically produces the same output. There are two major causes of non-repeatability: non-determinism of the operator and inability to provide the equal input (as in case of operators that depend on physical time, such as timer). Non-deterministic operators can be further subdivided into operators that are internally non-deterministic (their state depends on some form of a random function/externally changing state) and input non-deterministic—the output depends on the order of events between different inputs.

Grouping

The event processing programming model provides elastic scale-out of event processing computations using the concept of grouping. For instance, the following query uses grouping:

```
TemporalInput
    .From(table)
    .RegroupBy(e => e.MachineId)
    .Avg(newTumblingWindow(TimeSpan.FromMinutes(5)),
        e => e.CpuUsage)
    .To(anotherTable);
```

The event streams in the event processing programming model may be subdivided into disjoint groups using a user-specified grouping key. Thus, each stream of events is a set of sub-streams, one per unique value of the key. All operators in the query are applied to each of the sub-streams independently and do not share the state. In the query above, the user will receive independent results for each sub-stream—e.g. one average CPU usage value per machine per time window of five minutes.

In this example, the concept of grouping is exposed by an example of one of the abstractions 140 called herein a RegroupBy operator, which takes a key selector as a parameter. If no group criteria are specified, the data flow can be viewed as a single logical group that contains all events.

Some event stream sources can also take the group function as a parameter for convenience. The following is an example of such an event stream source definition:

```
var table=service.GetAzureTableSource<int,CpuReading>
    ( . . . , e=>e.MachineId);
```
To operate over all events, the user can re-group the data flow with a key selector that returns a constant.

Example API

In this section, the examples of the main API constructs elements (which are each examples of the abstractions 140 of FIG. 1) are elaborated. That said, this is just an example.

Definition Entities Recap

Source: defines a mechanism or a computation to produce an event stream. For example HTTPSourceDefinition defines a mechanism to create a stream of events from all requests sent to a specific HTTP URL.

Sink: defines a mechanism or a computation to consume an event stream. For example AzureBLOBSinkDefinition defines a mechanism to store a stream of events into an Azure BLOB.

QueryDefinition: defines a computation which takes all events from a Source and puts them in a Sink. For example take all events from HTTPSource(ingressUri) and put them in the AzureBLOBSink(blobUri, storageAccountConnectionString)

Runtime Entities Recap

Although this is highly dependent on the underlying event processing service that consumes queries:

Query: created from a QueryDefinition, it represents the runtime computation which takes all events from a source (instantiated from a SourceDefinition), and puts them in a sink (instantiated from a SinkDefinition).

Stream: as a facility in the service, it is an event stream instantiated from a Stream hosted and controlled by the event processing service. The service provides a Source and Sink to consume or produce events to a Stream.

Events and Streams

Events are records: key-value/associative collections. The values can be of any of the primitive types (.net/JSON), arrays or associative collections (maps/dictionaries).

A Stream provides determinism over ordered and temporal events: given the same ordered input and same query it will always generate the same ordered output.

An event stream is characterized by its temporal and orderly nature. Sources for Streams implements ISource. It can be configured with a selector expression for the grouping. If one of these elements are missing, the underlying source will use its default behavior for that particular element. The following is an example ISource definition.

```
// Get an HTTP source definition as an Event Stream
1: var input = svc.GetHttpSource<int, CpuReading>(
       "http://europe.azure.com/cpu-readings",
       e => e.MachineId,
       e => e.TimeStamp,
       TimeSpan.FromSeconds (10));
```

Sinks for Event Streams (implementing ISink) retains the temporal and order properties of Event Streams.

```
// Get a BLOB sink definition as an Event Stream
1: var storage = svc.GetAzureBlobSink<string, CpuAverage>(
    "https://myaccount.blob.core.windows.net/mycontainer/myblob",
    "DefaultEndpointsProtocol=https;AccountName=...;AccountKey=...");
```

Event streams may be sub-divided into groups. Groups are specified by a grouping key. Effectively, in this case, an event stream is a set of sub-streams, one for each unique value of the key. Computations are applied to each sub-stream independently. A re-grouping construct can be used to change the grouping. To operate over all events across groups, the user can re-group all groups into one group.

Service Context

Queries are deployed inside a service. The service is capable of processing query definitions and performing management operations on the queries such as Start/Stop query. The simple gesture for initializing a service context may be as follows:

```
// Get source and sink from Event Stream
1: ServiceContext svc = new ServiceContext(serviceUri);
```

From/To Queries are defined starting with TemporalInput.From(source) gesture taking a ISource as parameter and returning a IGroupedStream interface which defines the set of operators available for Event Streams. IGroupedStream represent a partitioned event stream. The query definition is returned when the To gesture is called on the IGroupeStream with a ISink as parameter.

SteamR Operators

Filter (Where)

Based on a user defined predicate expression applied to each individual Event, determines which events should be kept or removed from a Grouped Stream.

```
TemporalInput.From(httpSource)
    .Where(e => e.Payload.CpuUsage > 50)
        .To(blobSink);
```

Projection (Select)

Applies user expression to each individual Event and produces a new Event, potentially of a different type. The following coding example shows how filtering and projection are used:

```
TemporalInput.From(httpSource)
    .Select(e => new CpuReading( ) { CpuUsage = e.Payload.CpuUsage
        / 10 })
    .To(blobSink);
```

Multicast/Union (Multicast/Union)

The multicast operator creates multiple copies of each Grouped Stream (group membership/key are not modified by a multicast). The union operator combines multiple Grouped Streams into a single Grouped Stream (group membership/key is not modified, events with the same key will end in the same group). Ordering is preserved by union.

Aggregate (Aggregate)

Aggregate operators apply an aggregate function into a sub-set of a Grouped Stream. This window can be defined by temporal properties (such as window time duration), number of individual events in each group (count window) or a predicate that defines the start and end of the sub-set (frame or conditional based windows). Aggregate functions: Average, Min, Max, Count, Sum, and StdDev.

An Aggregate might be set up as follows:

```
TemporalInput.From(source).Avg(new
    TumblingWindow(TimeSpan.FromSeconds(5)),
        e => e.Payload.CpuUsage,
        (avg) => new CpuReading( ){CpuUsage = avg})
    .To(cpu5sSink);
```

Multi-Aggregate computations are also supported. The API allows for a number of aggregates functions to be applied to a payload. The following example illustrates the application of 3 aggregate functions to an event payload.

```
TemporalInput.From(source).
.MultiAggregate(new TumblingWindow(TimeSpan.FromSeconds(30)),
        w => w.Average(e => e.Payload.CpuUsage), // first agg
        w => w.Min(e => e.Payload.CpuUsage),    // second agg
        w => w.Max(e => e.Payload.CpuUsage),    // third agg
        (key, avg, min, max) => new CpuAggregates( )   // projection
        {
            AvgCpu = avg,
            MinCpu = min,
            MaxCpu = max,
            Region = key
        })
.To(blobRegionEndpoint);
```

TopK (topK)

TopK is an aggregate function that ranks events that form a sub-set of a Grouped Stream and produces as outputs the top K values for each Group inside the Grouped Stream. This sub-set (or window) can be defined by temporal properties (such as window time duration), number of individual events in each group (count window) or a predicate that defines the start and end of the sub-set (frame or condition). It is applied the same way functions are applied in the above code snippet.

Window Definition (*Window)

A window buffers event subsets based either on count (count window), on a condition or on temporal properties (such as window time duration). Then an arbitrary set of operators can be applied on this sub-set. The Code sample of a tumbling windows operator follows:

```
TemporalInput.From(source)
        .MultiAggregate(new TumblingWindow
            (TimeSpan.FromSeconds(5)),
                win => win.Average(e => e.Payload.CpuUsage),
                (avg) => new CpuReading ( )
                {
                    CpuUsage = avg
                }
            )
.To(cpu5sSink);
```

The event processing programming model defines 4 specific windows all inheriting from the window operator; those are CountWindow, ConditionalWindow, Tumbling Window and Hopping Window.

ReGroup by/Merge (RegroupBy/Merge)

The regroupby operator redefines the Event group membership by applying a new keying function to each individual Event. As output, the regroupby operator produces a new set of Grouped Streams based on the new key. The merge operator is simply a macro based on regroupby where the key is a constant value (the result is to have all Events to have the same group membership, i.e., a set of Grouped Streams with just one group).

```
TemporalInput.From(cpu5sSrc)
    .RegroupBy(e => e.ClusterID)
    .Avg(new TumblingWindow(TimeSpan.FromSeconds(5)),
        e => e.Payload.CpuUsage,
        (avg) => new CpuReading ( ){CpuUsage = avg})
    .To(cpu5sSink);
```

Join (Join)

In its simplest form, it correlates two Grouped Streams over a count Window.

Temporal Join (TemporalJoin)

Based on a user defined predicate expression and a user defined projection expression applied to a pair of Events, correlates two Grouped Streams within a given temporal window (duration).

Time Travel Join

Similar to the temporal join, as it correlates two Grouped Streams, with the additional ability of looking back in the history of one of the set of Grouped Streams (aka time travel). The following is an example of a query with historical and live streams.

```
IQueryDefinition<int, CpuAlarm> q3Def =
SteamR.From(cpu5sSrc)
.TimeTravelJoin(SteamR.From(cpu5sSrc), // right stream
    TimeSpan.FromHours(1), // validity applied to right stream
    TimeSpan.FromDays(-365), // time travel applied to right stream
    (live, hist) => live.Payload.MachineId == hist.Payload.MachineId
    && live.Payload.CpuUsage > hist.Payload.CpuUsage, // join predicate
    (live, hist) => new CpuAlarm( )
    {
LiveCpuUsage = live.Payload.CpuUsage,       HistCpuUsage =
hist.Payload.CpuUsage,                              MachineId
=                                           live.Payload.MachineId,
TimeStamp = live.Payload.TimeStamp
    })   // join projection
.To(blobAlarmEndpoint);
```

Time travel join is a special operator that deserves a bit more detail. To enable advanced analytics on live and historical data, the event processing programming model may introduce Temporal Join with time travel. The above sample represents a typical scenario.

This operator allows travelling back in time on the historical data (replaying events and modifying their timestamps according to rightTimeTravelShift parameter) and then correlating it with a live stream through a CEDR temporal join. The rightDuration parameter specifies how to changes the duration of historical events to be able to join them with the point events from the live stream. A very interesting aspect of the Time Travel Join is that it is driven by the timeline of the live stream.

In the simplest implementation, the complete historical stream would be read from the beginning of time and join it with the live stream. However, in many cases, this is undesirable, because the historical stream can have a lot of unnecessary data and it can take considerable time before live and historical streams will be aligned in time. For example, if the historical stream contains data from the last 10 years, that would require to preprocess 9 years of data before getting to the part that can actually be joined.

Figure 6:
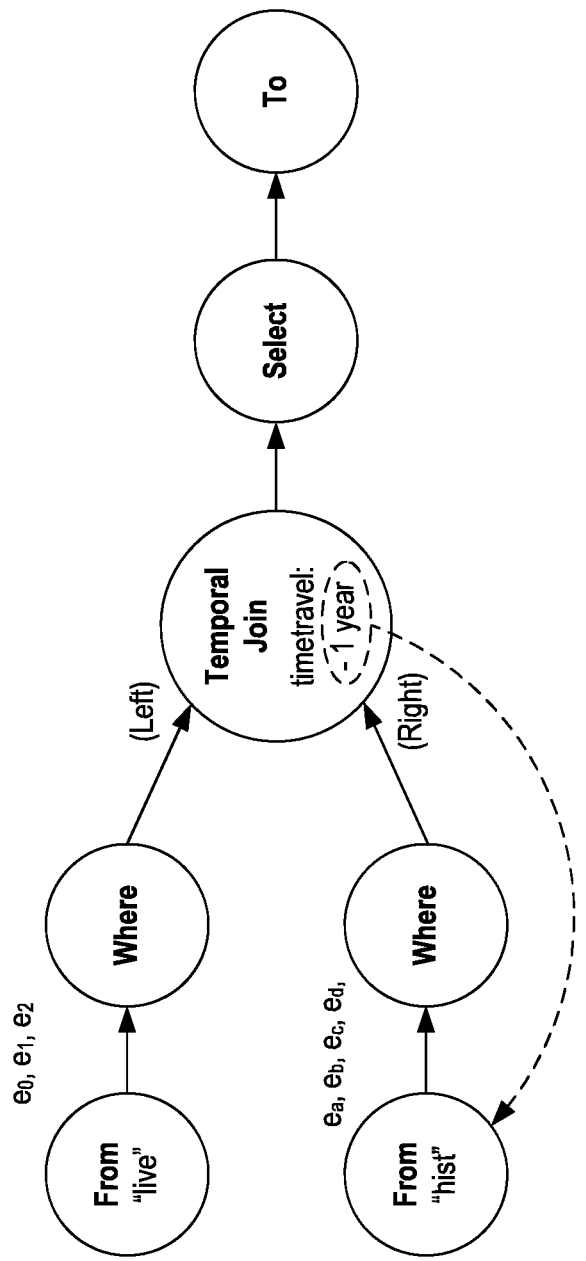
FIG. 6 illustrates an event flow associated with the joining of two event streams, one contemporary and one historical.

FIG. 6 illustrates an event flow associated with the joining of two event streams, one contemporary and one historical. Instead of replaying all events from the start, it would be more efficient to communicate to the source of the historical stream that the only data we are interested in goes 1 year back in time. The time position, which we are interested in, cannot be determined at the compilation phase of the query. The start time position is discovered only when the join receives the first event from the live stream.

Mapping

The user surface layer we have been discussing so far is responsible for defining simple standard data transformations (such as "where", "select", etc.), hiding the complexity from the user. This layer is represented by the client side SDK or DSL. It contains client side proxies for service entities in a particular programming language and provides means for composition. On this layer the user is able to get built-in definitions and compose them into a query.

Another responsibility of this layer is to convert the language dependent SDK entities to their internal representation—which is language independent and can be understood by the entity composition layer. This process is called normalization. During this process is to map queries in some canonical form that can be mapped later in engines running either in cloud on edges. Although there may be different types of the real event processing engine; to the user it is all the same.

This document described the concepts of an event programming model programming model. The event processing programming model may unify different dimensions of stream processing, allows convenient integration of offline and online analytics, and collection of data in the cloud and on devices in an extensible and intuitive manner.

As the authoring of the various definitions may be performed using a computing system, and the corresponding queries run using a computing system, an example computing system will now be described.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 7:
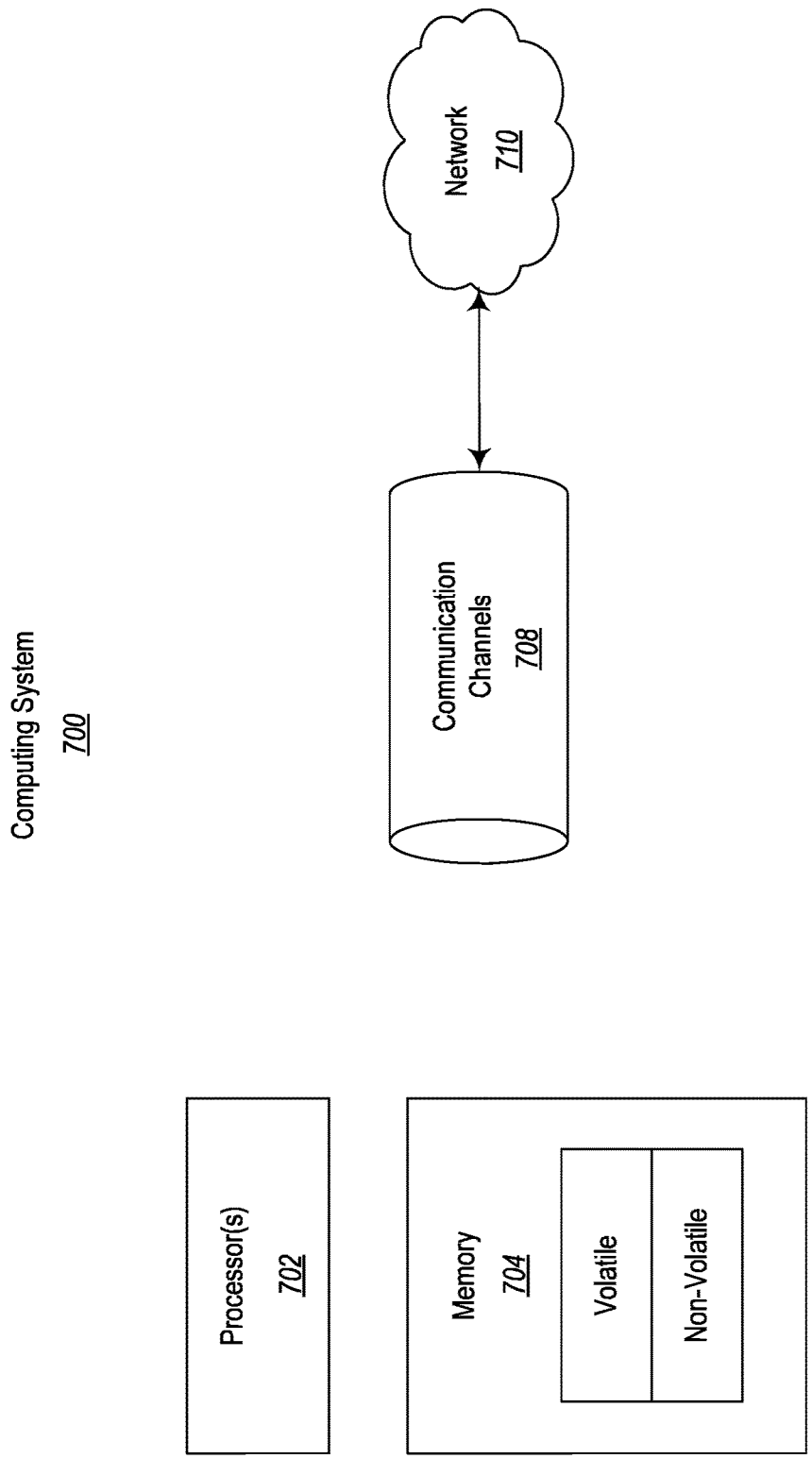
FIG. 7 illustrates an example computing system in which the principles described herein may operate.

As illustrated in FIG. 7, in its most basic configuration, a computing system 700 typically includes at least one hardware processing unit 702 and memory 704. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 704 of the computing system 700. Computing system 700 may also contain communication channels 708 that allow the computing system 700 to communicate with other message processors over, for example, network 710. The computing system 700 also includes a display, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage media having stored thereon computer-executable instructions that are executable by one or more processors to transform at least two event stream data sources, the computer-executable instructions including instructions that are executable to cause a computing device to perform at least the following:
   receiving, at the computing device, at least two input event streams, each of the at least two input event steams comprising a plurality of discrete events, each discrete event having a timestamp, wherein each of the at least two input event streams are available within a different execution context, and wherein one of the received input event streams is identified as a contemporary event stream with a first execution context, and one of the received input event streams is identified as an historical event steam with a different execution context;
   based at least on a received user query, authoring a transformation set of one or more transformations to be performed on the at least two input event streams, based on the first and different execution contexts of the at least two input event streams; and
   an execution module executing the transformation set such that one or more of the plurality of discrete events from the contemporary event stream are joined with one or more of the plurality of discrete events from the historical event stream according to the first and different execution context of the respective input event streams to generate a resulting joined event stream.

2. The computer program product in accordance with claim 1, the computer-readable storage media further having thereon the following:
   an authoring module configured to allow an author to author the transformation set.

3. The computer program product in accordance with claim 2, the authoring module configured to provide a set of programming abstractions including an event stream abstraction that is the same regardless of the event stream.

4. The computer program product in accordance with claim 2, the authoring module configured to provide a set of programming abstractions including an abstraction that is utilized to generate the resulting joined event stream by joining the contemporary event stream with the historical event stream.

5. The computer program product in accordance with claim 1, the computer-readable storage media further having thereon the following:
   a context identification module identifying the execution context to the execution module so that the execution module can cause the transformation set to be performed in the execution context.

6. The computer program product in accordance with claim 5, the execution context being a local computing system.

7. The computer program product in accordance with claim 5, the execution context being a cloud computing environment.

8. The computer program product in accordance with claim 5, the computer-readable storage media further having thereon the following:
   an authoring module configured to allow an author to author the context identification module.

9. The computer program product in accordance with claim 1, the computer-readable storage media further having thereon the following:
   an initiation control configured to initiate the execution module upon detection of user input.

10. The computer program product of claim 1, wherein the plurality of discrete events within the historical event stream are each associated with a single timestamp that occurred in the past.

11. The computer program product of claim 1, where the event streams comprise discrete events that describe one or more of the following: resource consumption, resource utilization, log records, performance counters, identified anomalies, communication records, user interactions, status updates, sensor data, or trend data.

12. The computer program product of claim 11, wherein the historical event stream comprises a plurality of resource consumption events for a plurality of resources, each of resource consumption events being identified by a unique timestamp that occurred in the past.

13. The computer program product of claim 12, wherein the contemporary event stream comprises a plurality of different resource consumption events for the plurality of resources.

14. A method, executed at a computer system including one or more processors, for causing a resulting event stream to be generated by executing a transformation set on one or more input event streams, the method comprising:
   accessing, at the computer system, at least two input event streams, each of the at least two input event streams comprising a plurality of discrete events, each discrete event having a timestamp, wherein each of the at least two input event streams are available within a different execution context, and wherein one of the received input event streams is identified as a contemporary event stream with a first execution context, and one of the received input event streams is identified as an historical event stream with a different execution context,
   based at least on a received user query, authoring, at the computer system, a transformation set of one or more transformations to be performed on the at least two input event streams, based on the first and different execution contexts of the at least two input event streams; and executing, at the computer system, the transformation set such that one more of the plurality of discrete events from the contemporary event stream are joined with one or more of the plurality of discrete events from the historical event stream, according to the first and different execution context of the respective input event streams, to generate a resulting joined event stream.

15. The method in accordance with claim 14, the one or more transformations comprising a filtering operation that is applied to the at least two input event streams.

16. The method in accordance with claim 15, the one or more transformations comprising event generation logic for generating events of the resulting joined event stream, the event generation logic using a filtered particular event stream as input.

17. The method in accordance with claim 14, the one or more transformations comprising event generation logic for generating events of the resulting joined event stream.

18. The method in accordance with claim 14, further comprising:

accessing, at the computer system, an event stream sink representation representing a particular event sink available in the execution context and providing the resulting event stream into the particular event sink.

19. A computer system comprising:

one or more processors; and one or more computer-readable hardware storage media having thereon computer executable instructions that are structured such that, when executed by the one or more processing units, causes the computer system to perform the following:

obtaining, at the computer system, a transformation set of one or more transformations to be performed on at least two received input event streams including at least one input event stream that is identified as a contemporary event stream available within a first execution context, and at least one of the received input event stream that is identified as an historical event stream available within a different execution context, wherein each of the at least two input event streams comprises a plurality of discrete events with an associated timestamp;

coupling, at the computer system, the transformation set to the contemporary event stream and to the historical event stream such that when the transformation set executes, the transformation set is performed on the contemporary event stream and the historical event stream; and executing, at the computer system, the transformation set to generate a resulting joined event stream by at least joining one or of the plurality of discrete events of the contemporary event stream with one or more of discrete events of the historical event stream.

20. The computer system in accordance with claim 19, the historical event stream being a historical time-shifted version of the contemporary event stream.

21. The computer system in accordance with claim 19, the transformation set comprising a filtering operation that is applied to at least one of the contemporary event stream and the historical event stream.

22. The computer system in accordance with claim 19, the transformation set comprising event generation logic for generating events of the resulting joined event stream, the event generation logic using at least a portion of the contemporary event stream and at least a portion of the historical event stream as input.

\* \* \* \* \*